US00RE35618E

United States Patent [19]

Goossens

[11] E Patent Number: Re. 35,618

[45] Reissued Date of Patent: Oct. 7, 1997

[54] GEAR HINGE

[75] Inventor: Philip A. Goossens, Cordova, Tenn.

[73] Assignee: Pemko Manufacturing Company, Ventura, Calif.

[21] Appl. No.: 389,028

[22] Filed: Feb. 15, 1995

Related U.S. Patent Documents

Reissue of:

[64] Patent No.: 5,337,451
Issued: Aug. 16, 1994
Appl. No.: 925,374
Filed: Aug. 4, 1992

[51] Int. Cl.[6] ..... E05D 7/00

[52] U.S. Cl. ..... 16/354

[58] Field of Search ..... 16/354, 273, 380, 16/319, DIG. 27

[56] References Cited

U.S. PATENT DOCUMENTS

| | | | |
|---|---|---|---|
| 3,092,870 | 6/1963 | Baer . | |
| 3,374,499 | 3/1968 | Horstman | 16/354 |
| 3,402,422 | 9/1968 | Baer . | |
| 4,152,221 | 5/1979 | Schaedel | 204/27 |
| 4,284,861 | 8/1981 | Senften . | |
| 4,583,262 | 4/1986 | Werner . | |
| 4,881,346 | 11/1989 | Block . | |
| 4,895,271 | 1/1990 | Desjardins et al. | 16/319 |
| 4,976,008 | 12/1990 | Baer . | |
| 4,979,265 | 12/1990 | Grass . | |
| 4,996,739 | 3/1991 | Baer . | |
| 4,999,878 | 3/1991 | Baer . | |
| 4,999,879 | 3/1991 | Baer | 16/354 |
| 4,999,880 | 3/1991 | Baer . | |
| 5,062,181 | 11/1991 | Bobbowski et al. | 16/273 |
| 5,104,507 | 4/1992 | Offenburger | 204/180.6 |

FOREIGN PATENT DOCUMENTS

| | | | |
|---|---|---|---|
| 2457413 | 6/1975 | Germany | 16/354 |
| 1596274 | 8/1981 | United Kingdom | 16/354 |

*Primary Examiner*—Chuck Y. Mah
*Attorney, Agent, or Firm*—Graham & James LLP

[57] ABSTRACT

A gear hinge having a trust bearing which is less likely to wear. The hinge may include, in various combinations, gears having relatively small, rounded teeth, hinge members having anodized surfaces, bearings which may be produced by a gas assisted injection molding process and bearings which are relatively hard.

16 Claims, 3 Drawing Sheets

GEAR HINGE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention is directed to a hinge, and more particularly, a hinge having geared hinge members.

2. Description of the Related Art

As described in U.S. Pat. No. 3,092,870, one type of hinge, often referred to as a "gear hinge" includes a pair of hinge members having intermeshing gear portions. Applications for gear hinges include commercial swinging doors and commercial folding curtains used to divide large rooms. Such vertical applications typically require the hinge to extend the full length of the door or curtain and to have a plurality of thrust bearings distributed over the length of the hinge to support the weight of the hinge members. The thrust bearings are usually disposed in adjoining recesses of each hinge member.

One of the major problems associated with vertical applications of such full-length gear hinge is premature wear of the thrust bearings. Thrust bearing wear is often the result of twisting of the bearings as they transfer a load from one hinge member to the other. Additionally, wear may be caused by friction between the bearing and the hinge members. Because many thrust bearings are composed of relatively soft plastic, the likelihood that the thrust bearing may be twisted or damaged by friction between the bearing and the hinge is enhanced. Additionally, many bearings are produced by a conventional liquid molding process which causes the bearing to shrink at different rates at the bearing center as compared to the longitudinal end portions of the bearing. Thus, a 10% error factor must often be allowed for at the longitudinal end portions in order to assure proper clearance at the center. The 10% error at the end portions can result in a looser fit can contribute to twisting of the bearing and premature wear. Finally, wear may be caused by the sharp teeth of the gears rubbing against the bearing as the hinge rotates.

In addition to the cost of the thrust bearings themselves, replacement of the bearings typically requires that the door be taken down and that the hinge be disassembled. Thus, replacement of the bearings often requires considerable time, effort and expense.

U.S. Pat. No. 4,999,878 to Baer entitled "Thrust Bearing Assembly in a Pinless Hinge Structure" suggests reducing twisting of the bearings by increasing the length of the thrust bearings. This is said to be accomplished by essentially joining three smaller bearings in a spaced relationship. The three smaller bearings are positioned in three corresponding slots. Due to limitations in manufacturing tolerances, however, the bearings often may not fit properly into the corresponding slots such that only one of the bearings will actually rest upon the bottom of its respective slot. As a result, only a small single bearing may actually support the entire load, which can cause excessive twisting and premature wear.

U.S. Pat. No. 4,976,008 to Baer entitled "Multi-Piece Thrust Bearing Assembly for a Hinge Structure" proposes a hinge design which utilizes inserts, located between the thrust bearing and the hinge member, for protecting the bearing. Such a design appears to be relatively complicated and as a result subject to increased manufacturing and installation costs.

An additional proposed solution is described in U.S. Pat. No. 4,996,739 to Baer entitled "Thrust Bearing Assembly for Hinge Structure". The '739 patent in essence concedes that the thrust bearings will have to be replaced often and provides a relatively complicated multi-piece bearing that is designed to facilitate replacement.

Another problem often encountered can result from even a minor misalignment of the gears. If the gears of the hinge are misaligned, the sharp portions of a tooth of one of the gears will often grab an adjacent portion of a tooth of the other gear and bind. This binding usually results in a jerking movement as the gears rotate. Prior attempts to solve this problem have typically included machining the gears within extremely tight tolerances. Such machining can significantly increase the cost of the hinge.

SUMMARY OF THE INVENTION

It is an object of the present invention to provide an improved gear hinge obviating for practical purposes, the above-mentioned limitations.

In accordance with the present invention, these and other objectives are achieved by providing a gear hinge which includes, in various combinations, gears having relatively small, rounded teeth, hinge members having anodized surfaces, thrust bearings which may be produced by a gas assisted injection molding process such as the GAIN TM System and thrust bearings which are relatively hard. The advantages of these features will be discussed below.

Decreasing the size of the gear teeth, i.e. increasing the root diameter of the gear while maintaining the same outside diameter, increases the surface area of the portion of the gear which is in contact with the bearing. Increasing the surface area decreases the pressure on the portions of the bearing which are in contact with the gear. Thus, twisting and wear are advantageously reduced. Additionally, as the edge portions of the teeth tend to cause wear on the bearings, reducing the size of the teeth reduces the wear caused by the edge portions of the teeth.

Gear teeth which include a curved end portion are advantageous because the sharp edges which tend to bind with the other gear are eliminated. Thus, binding as a result of a slight misalignment will be substantially reduced or eliminated. Gears having curved teeth, therefore, can be machined to looser tolerances which can result in substantial savings in production costs.

Anodizing the hinge members after machining provides a number of advantages over prior design. Most importantly, the anodizing provides a smooth, hard surface. The smooth surface has a low coefficient of friction, thus decreasing wear on the thrust bearing normally caused by friction between the bearing and the hinge members. Additionally, anodizing provides corrosion and abrasion resistance.

Employing a thrust bearing which is harder than those previously used in the art provides a number of advantages. First, the harder bearing resists wear caused by friction between the bearing and the hinge members. Second, the harder bearing is less likely to twist, which also prevents wear.

Producing the thrust bearings by a gas assisted injection molding process reduces or eliminates the variations in dimensions caused by shrinkage during the manufacturing process. Thus, the bearings may be produced to closer tolerances such that they fit more securely into the hinge. The improved fit also reduces the tendency of the bearing to twist, thus reducing wear.

The present invention, which is best defined by the claims appended to the disclosure, will be more fully understood when considered in light of the detailed discussion below taken in conjunction with the drawings.

BRIEF DESCRIPTION OF THE DRAWINGS

A detailed description of the preferred embodiments of the invention will be made with reference to the accompanying drawings.

DETAILED DESCRIPTION OF THE PREFERRED EMBODIMENT

The following is a detailed description of the best presently known mode of carrying out the invention. This description is not to be taken in a limiting sense, but is made merely for the purpose of illustrating the general principles of the invention. The scope of the invention is defined by the appended claims.

Figure 1:
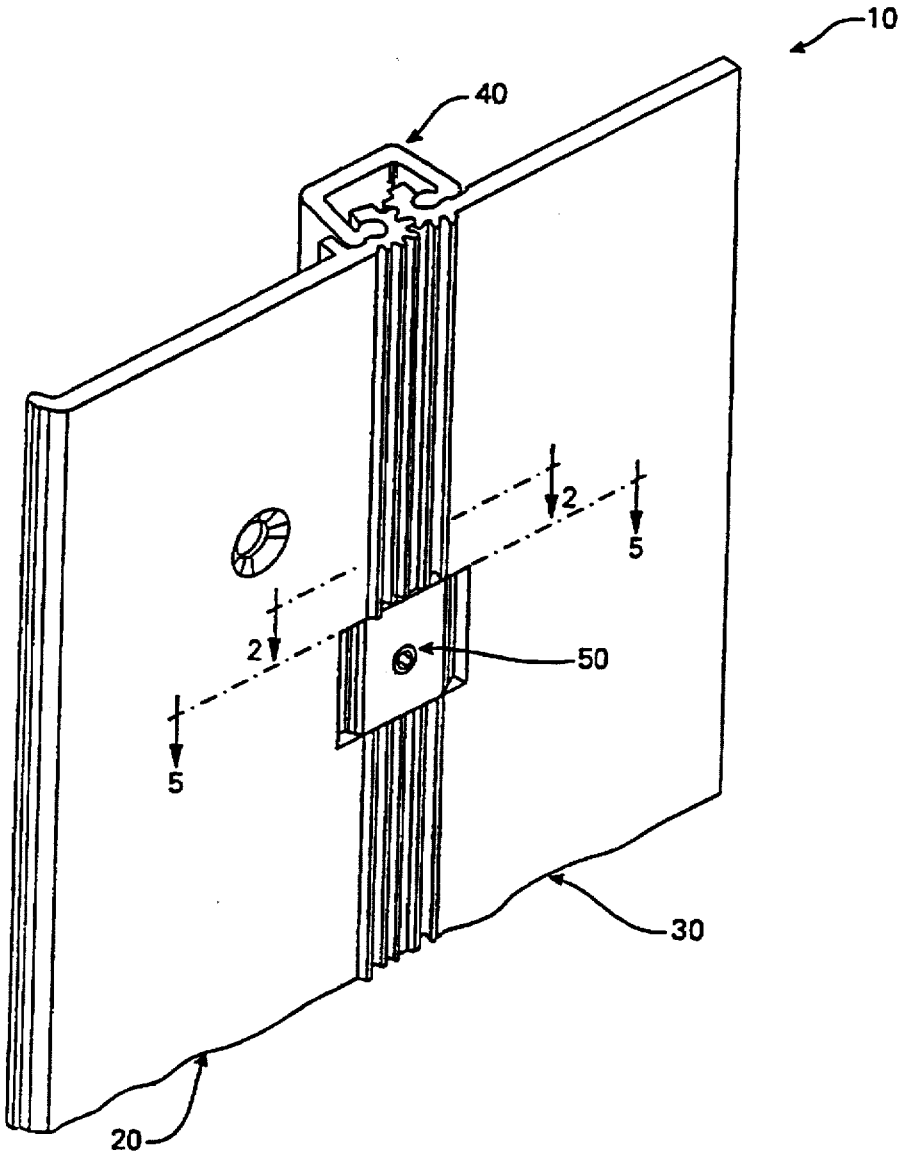
FIG. 1 is a perspective view in accordance with one embodiment of the present invention.

As illustrated for example in FIG. 1, a preferred embodiment of the gear hinge 10 may include a first hinge member 20, a second hinge member 30, a clamp 40 for holding the first ad second hinge members and a thrust bearing 50 together.

Figure 2:
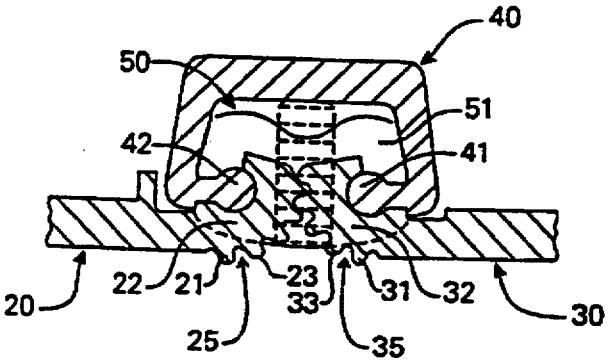
FIG. 2 is a sectional view taken along line 2—2 of FIG. 1 illustrating a hinge structure in an open position in accordance with one embodiment of the present invention.
Figure 3:
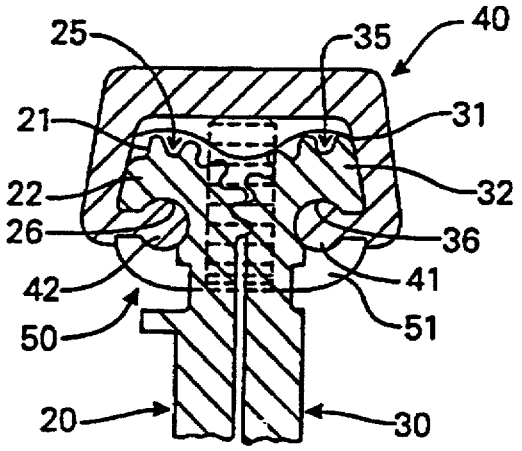
FIG. 3 is a sectional view similar to FIG. 2 illustrating a hinge structure in a closed position in accordance with one embodiment of the present invention.

In the preferred embodiment illustrated for example in FIGS. 2 and 3, the hinge members 20 and 30 may rotatably engage each other along adjacent longitudinal gear portions 25 and 35, respectively. The gear portions 25 of hinge member 20 includes teeth 21 carried by a base portion 22. The gear portion 35 of hinge member 30 includes teeth 31 and a base portion 32. The hinge members 20 and 30 may be slidably coupled to one another by the clamp 40. The clamp 40 includes bearing portions 41 and 42. The hinge members 20 and 30 each have a longitudinal channel 26, 36 (see FIG. 5) which receives and rotates about the associated bearing portion 42 and 41, respectively. The hinge member 20 may be rotatable about a 180 degree arc with respect to the hinge member 30.

Figure 4:
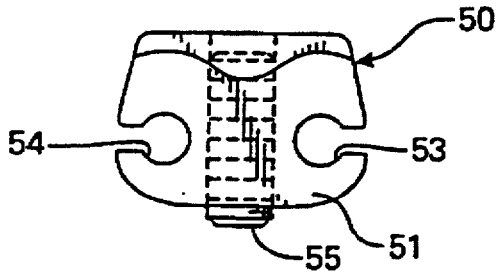
FIG. 4 is a plan view of a bearing in accordance with one embodiment of the present invention.

The thrust bearing 50 supports the weight of the hinge members 20 and 30 when the hinge is in a vertical orientation such as that illustrated in FIG. 1. In the preferred embodiment illustrated for example in FIG. 4, the bearing 50 may include a support surface 51. The bearing may also include channels 53 and 54 which engage the bearing portions 41 and 42, respectfully, of the clamp 40. The clamp 40 may be secured to the bearing 50 by a screw 55.

In the illustrated embodiment, the thrust bearings are formed from a material which is 5–15% Teflon TM filled acetal. (Teflon is a trademark of the DuPont Company.) The bearings may be produced by a gas assisted injection molding process (such as the GAIN TM System) which substantially reduces if not virtually eliminates variations in the dimensions of the bearings. Thus, the channels will have essentially the same diameter in the center portion of the bearing as it does at the ends. As discussed above, this enables the bearings to be produced to closer tolerances, thus enabling a more secure fit into the hinge than previous designs. For example, according to a preferred embodiment of the present invention, the ratio of the inside diameter of the channels 53 and 54 to the outside diameter of the bearing portions 41 and 42 is approximately 1.045. This is a substantial improvement over the ratio of 1.185 known to be previously employed. Also, the bearing may have a hardness of approximately 93–95 and preferably 94 on the Rockwell "M" scale. This is considerably harder than many prior bearings having a hardness of approximately 85 on the Rockwell "M" scale. As discussed above, the improved fit and increased hardness reduces the tendency of the bearing to twist, thus reducing wear.

Figure 5:
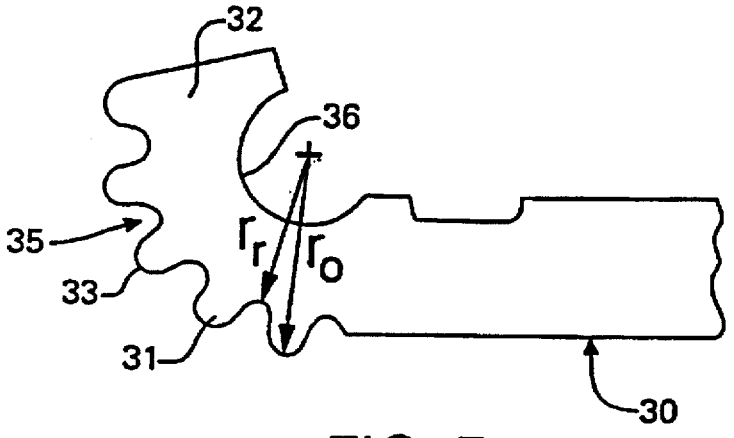
FIG. 5 is a sectional view taken along line 5—5 of FIG. 1 of a hinge member in accordance with one embodiment of the present invention.

As illustrated for example in FIGS. 2 and 5, in a preferred embodiment of the present invention, the teeth 21 and 31 may have curved or rounded end portions 23 and 33, respectively. As discussed above, these curved-end teeth prevent binding of the gears. Additionally, in accordance with a preferred embodiment of the present invention, the ratio of the outside diameter (represented by the outside radius $r_o$) to the root diameter (represented by the root radius $r_r$) may be approximately 1.2 which is considerably smaller than the ratio of 1.7 currently employed by many prior designs. The smaller ratio provides for a base 32 having far more surface area than that previously known in the art. As discussed above, the larger base 32 advantageously reduces wear on the support surface 51 of the thrust bearing 50.

Also, according to a preferred embodiment of the present invention, the hinge members 20 and 30 may be anodized after machining. The anodic coating may be, for example, a minimum of [3] *0.3* mils thick. As discussed above, the anodized surface is hard and smooth, thus reducing friction between the hinge member and the thrust bearing.

Figure 6:
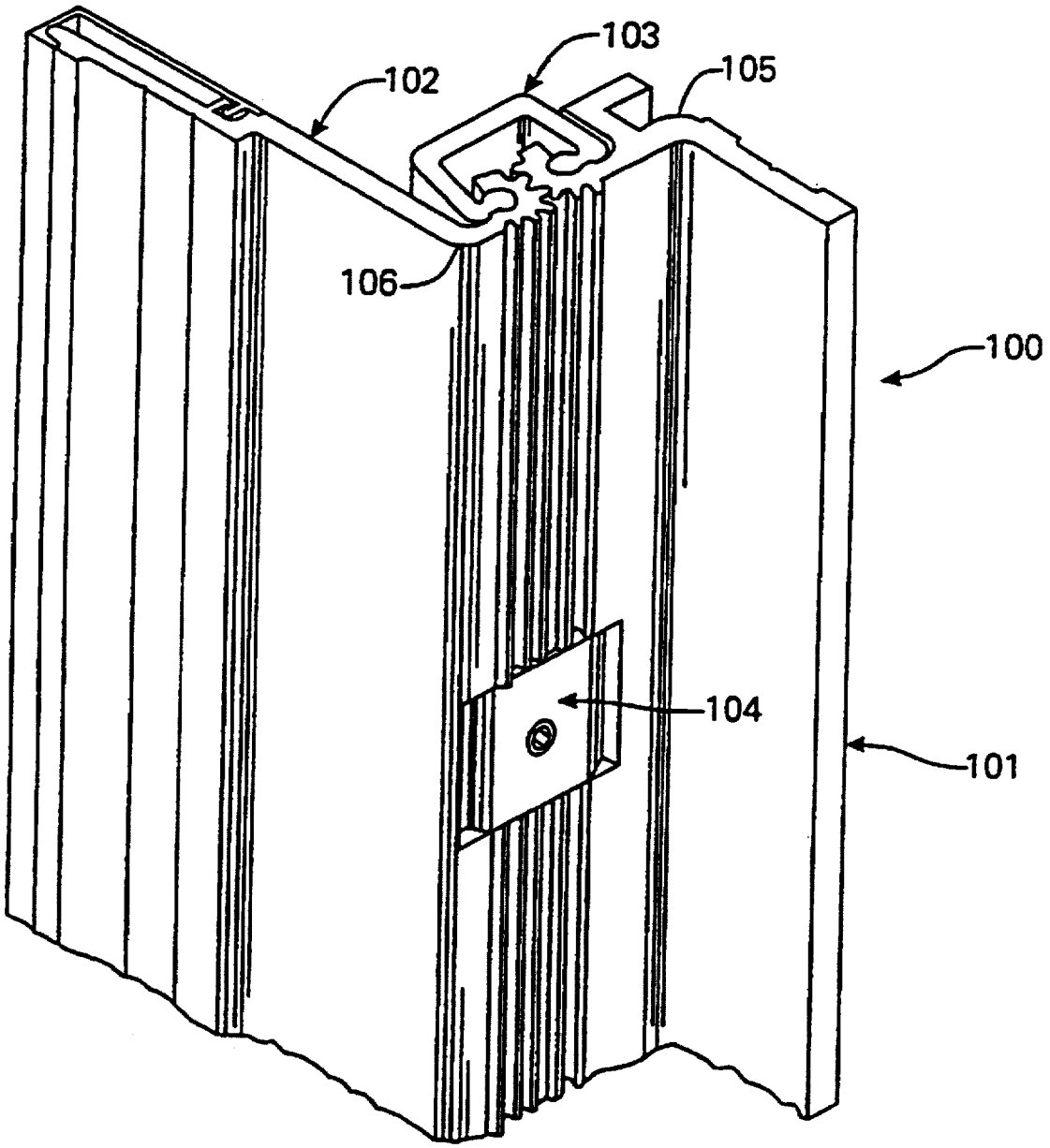
FIG. 6 is a perspective view in accordance with another embodiment of the present invention.

As illustrated for example in FIG. 6, a gear hinge 100 in accordance with a second preferred embodiment of the present invention may include a first hinge member 101 having an angle portion 105, a second hinge member 102 having an angle portion 106, a clamp 103, and a thrust bearing 104. The hinge member 102 may be rotatable about a 180 degree arc with respect to the hinge member 101. Additionally, the hinge members may be arranged such that they extend in the same direction when the hinge is in a closed position.

The second preferred embodiment may be used for applications such a retrofit. In such a retrofit, the hinge member 101 may be secured to a structure while a door may be mounted on the hinge member 102.

Although the present invention has been described in terms of a preferred embodiment above, numerous modifications and additions to the above-described preferred embodiment would be readily apparent to one skilled in the art. It is intended that the scope of the present invention extends to all such modifications or additions and that the scope of the present invention is limited solely by the claims set forth below.

I claim:

[1. A hinge, comprising:

first and second hinge members, each hinge member including a gear portion, the gear portion defining a base, a plurality of teeth extending from the base, a root diameter and an outsider diameter a thrust bearing for supporting the first and second hinge members; and a clamp for operably connecting the first and second hinge members and the thrust bearing;

wherein the outside diameter of the gear portion and the root diameter of the gear portion define a ratio less than 1.7.]

2. A hinge [according to claim 1], *comprising:*

*first and second hinge members, each hinge member including a gear portion, the gear portion defining a base, a plurality of teeth extending from the base, a root diameter and an outside diameter;*

*a thrust bearing for supporting the first and second hinge members; and*

*a clamp for operably connecting the first and second hinge members and the thrust bearing;* wherein the outside diameter of the gear portion and the root diameter of the gear portion define a ratio of approxiately 1.2.

[3. A hinge according to claim 1, wherein the outside diameter of the gear portion and the root diameter of the gear portion define a ratio of between approximately 1.2 and 1.7.]

4. A hinge [according to claim 1], *comprising:*

*first and second hinge members, each hinge member including a gear portion, the gear portion defining a base, a plurality of teeth extending from the base, a root diameter and an outsider diameter;*

*a thrust bearing for supporting the first and second hinge members; and*

*a clamp for operably connecting the first and second hinge members and the thrust bearing;*

*wherein the outside diameter of the gear portion and the root diameter of the gear portion define a ratio less than 1.7,* wherein the teeth define a free end, the free end having a curved shape.

5. A hinge according to claim [1] 2, wherein at least one of the hinge members defines an angled portion, located substantially adjacent to the gear portion, having an angle of approximately 90 degrees.

6. A hinge according to claim 5, wherein both of the hinge members define an angled portion, each angled portion located substantially adjacent to the rear portion, each angled portion having an angled of approximately 90 degrees.

7. A hinge [according to claim 1], *comprising:*

*first and second hinge members, each hinge member including a gear portion, the gear portion defining a base, a plurality of teeth extending from the base, a root diameter and an outsider diameter;*

*a thrust bearing for supporting the first and second hinge members; and*

*a clamp for operably connecting the first and second hinge members and the thrust bearing;*

*wherein the outside diameter of the gear portion and the root diameter of the gear portion define a ratio less than* 1.7, wherein:

at least one of the first and second hinge member is provided with an anodic coating; and the thrust bearing has a hardness greater than 85 on the Rockwell "M" scale.

[8. A hinge member according to claim 7, wherein the anodic coating has a thickness of at least 3 mils.]

9. A hinge according to claim 7, wherein the thrust bearing has a hardness of between approximately 93 and 95 on the Rockwell "M" scale.

10. A hinge according to claim 7, wherein the thrust bearing has hardness of approximately 94 on the Rockwell "M" scale.

11. A hinge according to claim 7, wherein at least one of the hinge members defines an angled portion, located substantially adjacent to the gear portion, having an angle of approximately 90 degrees.

12. A hinge according to claim 11, wherein both of the hinge members define an angled portion, each angled portion located substantially adjacent to the gear portion, each angled portion having an angle of approximately 90 degrees.

13. A hinge, comprising:

first and second hinge members, each hinge member including a gear portion;

a thrust bearing for supporting the first and second hinge members, the thrust bearing defining first and second channels, each channel defining an inside diameter; and a clamp for operably connecting the first and second hinge members and the thrust bearing, the clamp including first and second bearing portions, each bearing portion defining a diameter;

wherein the inside diameter of the thrust bearing channels and the diameter of the bearing portions of the clamp define a ratio less than 1.185.

14. A hinge according to claim 13, wherein the inside diameter of the thrust bearing channels and the diameter of the bearing portions of the clamp define a ratio of approximately 1.045.

15. A hinge according to claim 13, wherein the inside diameter of the thrust bearing channels and the diameter of the bearing portions of the clamp define a ratio of between approximately 1.045 and 1.185.

16. A hinge according to claim 13, wherein the thrust bearing defines first and second longitudinal end portions and a center portion, and wherein the inside diameter of the thrust bearing channel at the center portion is approximately equal to the inside diameter of the thrust bearing channel at least one of the first and second end portions.

17. A hinge according to claim 13, wherein at least one of the hinge members defines an angled portion, located substantially adjacent to the gear portion, having an angle of approximately 90 degrees.

18. A hinge according to claim 17, wherein both of the hinge members define an angled portion, each angled portion located substantially adjacent to the gear portion, each angled portion having an angle of approximately 90 degrees.

19. A hinge, comprising:

first and second hinge members, each hinge member including an anodic coating and a gear portion, each gear portion having a base and a plurality of teeth extending from the base and defining a root diameter and an outsider diameter, each of the teeth having a free end defining a rounded shape, the outside diameter of the gear portion and the root diameter of the gear portion defining a ratio of 1.2;

a clamp having first and second bearing portions for rotatably carrying the first and second hinge members; and a thrust bearing for supporting the first and second hinge members, the thrust bearing defining first and second channels for receiving the first and second bearing portions, respectively, of the clamp, the first and second channels defining respective inside diameters, first and second longitudinal end portions and a center portion such that the inside diameter of the thrust bearing channel at the center portion is approximately equal to the inside diameter of the thrust bearing channel at least one of the first and second end portions, and the thrust bearing having a hardness of 94 on the Rockwell "M" scale, and wherein each bearing portion of the clamp defines a diameter such that the inside diameter of the thrust bearing channels and the diameter of the bearing portions of the clamp define a ratio of 1.045.

* * * * *